United States Patent [19]

Burack et al.

[11] Patent Number: 5,292,390
[45] Date of Patent: Mar. 8, 1994

[54] OPTICAL FIBER ENCAPSULATING TECHNIQUES

[75] Inventors: John J. Burack, Toms River, N.J.; William R. Holland, Ambler, Pa.

[73] Assignee: AT&T Bell Laboratories, Murray Hill, N.J.

[21] Appl. No.: 954,720

[22] Filed: Sep. 30, 1992

[51] Int. Cl.$^5$ ............................................. B29C 65/18
[52] U.S. Cl. .................... 156/176; 156/179; 156/298; 156/303.1; 156/309.6; 156/311; 156/312; 385/76; 385/114
[58] Field of Search .............. 156/52, 56, 176, 177, 156/178, 179, 298, 309.6, 311, 312, 303.1, 55; 385/88, 89, 76, 114; 174/117 F

[56] References Cited

U.S. PATENT DOCUMENTS

| 2,714,571 | 8/1955 | Irion et al. | 156/311 |
| 3,239,396 | 3/1966 | Bohannon | 156/52 |
| 3,271,214 | 9/1966 | Tabor | 156/52 |
| 3,513,045 | 4/1970 | Emmel et al. | 174/117 F |
| 3,666,587 | 5/1972 | Nagao | 156/309.6 |
| 3,802,974 | 4/1974 | Emmel | 156/55 |
| 4,138,193 | 2/1979 | Olszewski et al. | 385/114 |
| 4,496,215 | 1/1985 | Shaheen et al. | 385/114 |
| 4,541,882 | 9/1985 | Lassen | 156/150 |
| 4,859,807 | 8/1989 | Swiggett et al. | 174/68.5 |
| 5,204,925 | 4/1993 | Bonanni et al. | 385/89 |

FOREIGN PATENT DOCUMENTS 279335  5/1990  Fed. Rep. of Germany ... 174/117 F

OTHER PUBLICATIONS

"Electro-Optical Board Technology Based on Discrete Wiring," W. Delbare et al., presented at 1991 International Electronics Packaging Conference, Sep. 17, 1991.
"COHRlastic R-10404 Medium Grade Product Data," Furon CHR Division, 407 East St., New Haven, Conn. 06509-9988 (No date).

Primary Examiner—Michael W. Ball
Assistant Examiner—Steven D. Maki
Attorney, Agent, or Firm—Roderick B. Anderson

[57] ABSTRACT

A plurality of optical fibers (13) are first bonded to an upper surface of a flat flexible plastic substrate (12). The optical fibers are covered with a layer (20) of thermoplastic material to form a composite structure comprising the thermoplastic material, the optical fibers and the plastic substrate. The composite structure is then compressed at a first elevated temperature and at a first relatively high pressure which are sufficient to bond or tack the thermoplastic material to the plastic substrate. The temperature of a composite structure is then cool while maintaining the first relatively high pressure. Thereafter, a second elevated temperature is applied to the thermoplastic material while compressing the composite structure at a second pressure. The second elevated temperature is higher than the first temperature and is sufficiently high to cause the thermoplastic material to flow about and encase the optical fibers, while the second pressure is smaller than the first pressure and is sufficiently small to avoid damaging said optical fibers. The various compression steps are applied by upper (17) and lower (16) platens of a press machine which are appropriately heated to apply the temperatures described above.

14 Claims, 1 Drawing Sheet

OPTICAL FIBER ENCAPSULATING TECHNIQUES

TECHNICAL FIELD

This invention relates to optical fiber interconnections and, more particularly, to techniques for encapsulating optical fibers on optical backplanes.

BACKGROUND OF THE INVENTION

The copending application of Burack et al., Ser. No. 07/936,484, filed Aug. 28, 1992, hereby incorporated herein by reference, describes a method for making optical backplanes by using a robotic routing machine to apply optical fibers to a flat surface of a flexible plastic substrate. The fibers are bonded to the substrate surface by a pressure-sensitive adhesive, and after routing they are covered by a plastic sheet that encapsulates them to protect them, to give the structure mechanical stability, and to keep the optical fibers in place during the handling of the optical backplane. The optical fibers of the optical backplane are typically used as large-capacity transmission lines between printed wiring boards or between optical circuits.

The patent application describes how a computer is used to provide optical fibers of the appropriate length between input and output ports, or tabs, of the optical backplane, it being important for optical transmission reliability that there not be minute deviations in the prescribed length of the line. The optical fibers are of course made of glass and are therefore susceptible to damage, particularly at locations at which the fibers overlap or cross over one another. In appluing a plastic encapsulation to the optical fibers after routing, it has been found that some of the optical fibers tend to break and other optical fibers tend to become displaced from their assigned physical positions. Further, it is difficult to bond reliably the optical fibers within a plastic composite structure such that the fibers are firmly mechanically supported in place even while free ends of the fibers are manipulated to interconnect the optical backplane to other structures. Finally, it would be desirable to be able to peel back the encapsulation to expose ends of optical fibers so that they could be interconnected with other apparatus.

Accordingly, there is a continuing need for techniques for encapsulating optical fibers on a flexible plastic substrate that are consistent with the requirements of mass production, which do not require great operator skill, which provide long-life structural support and protection to optical fibers, which maintain predetermined fiber placement, and which can be manipulated to expose optical fiber ends if necessary.

SUMMARY OF THE INVENTION

In an illustrative embodiment of the invention, a plurality of optical fibers are first bonded to an upper surface of a flat flexible plastic substrate. The optical fibers are covered with a sheet of thermoplastic material to form a composite structure comprising the thermoplastic material, the optical fibers and the plastic substrate. The composite structure is then compressed at a first elevated temperature and at a first relatively high pressure which are sufficient to bond or tack the thermoplastic material to the plastic substrate. The temperature of a composite structure is then allowed to cool while maintaining the first relatively high pressure. Thereafter, a second elevated temperature is applied to the thermoplastic material while compressing the composite structure at a second pressure. The second elevated temperature is higher than the first temperature and is sufficiently high to cause the thermoplastic material to flow about and encase the optical fibers, while the second pressure is smaller than the first pressure and is sufficiently small to avoid damaging said optical fibers.

In a preferred embodiment, the thermoplastic material is covered with a second sheet of flexible plastic, the second sheet being of the same material as the flexible plastic material and constituting part of the composite structure. Also, a layer of resilient thermally conductive material is included over the second sheet of flexible plastic for distributing stresses on the composite structure, and to avoid such concentration of stresses on the optical fibers as might damage the optical fibers. The various compression steps are applied by upper and lower platens of a press machine which are appropriately heated to apply the temperatures described above.

Optical backplanes made as thus described provide long-term reliable structural and mechanical support to the optical fibers, protect them from the external environment, but still provide access to the optical fiber ends as needed for making interconnections. This is because thermoplastic material by its nature flows in response to heat, which permits the plastic layers to be peeled back to expose the optical fibers, and thereafter, cooling of the thermoplastic material again encases the optical fibers.

These and other objects, features and benefits of the invention will be better understood from a consideration of the following detailed description taken in conjunction with the accompanying drawing.

DETAILED DESCRIPTION

Figure 1:
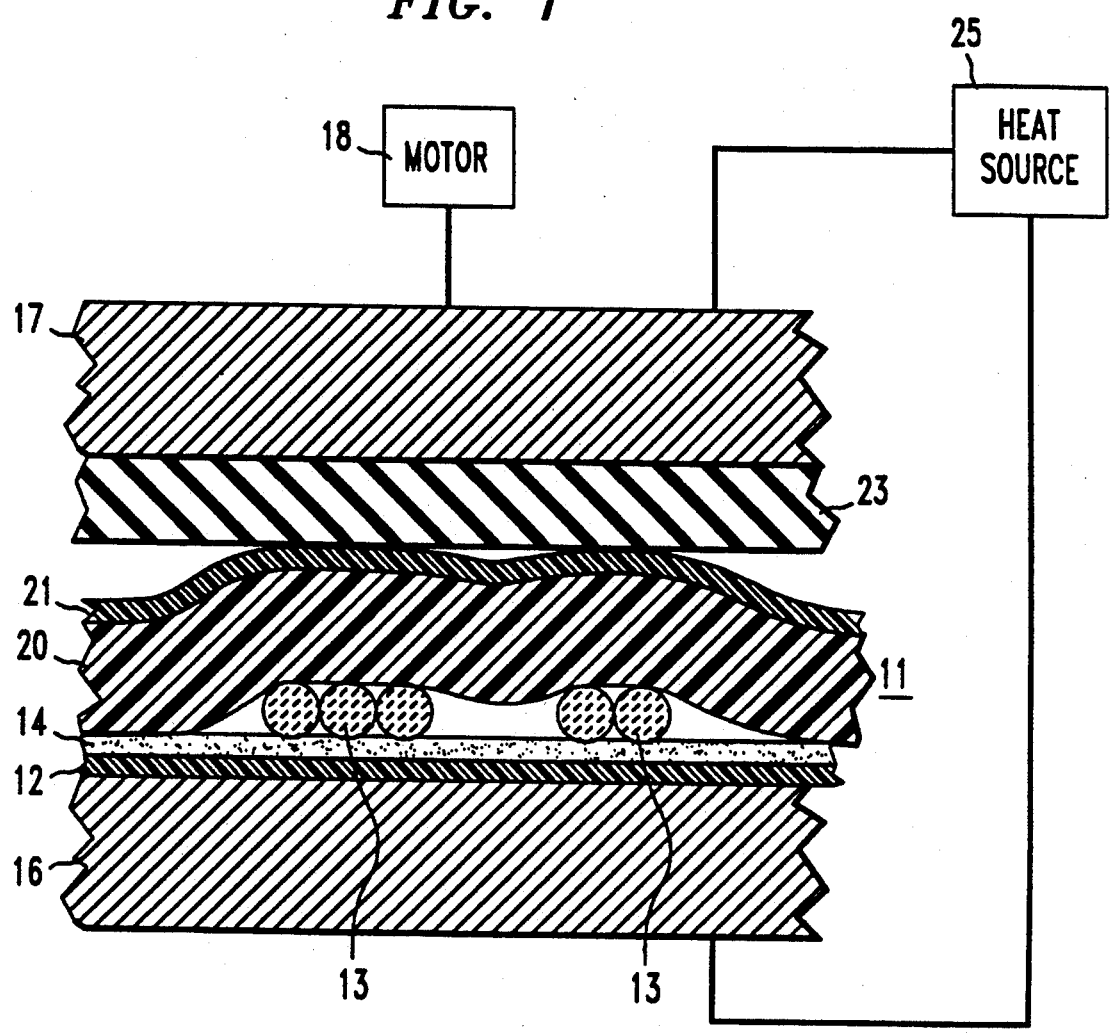
FIG. 1 is a schematic sectional view of apparatus for encapsulating optical fibers on an optical backplane in accordance with an illustrative embodiment of the invention.

Referring now to FIG. 1, there is shown schematically apparatus for encapsulating optical fiber in accordance with an illustrative embodiment of the invention. The various components as shown in the drawings are not necessarily drawn to scale, and in some cases dimensions have been distorted to aid in clarity of exposition. An optical backplane 11 comprises a flexible plastic substrate 12 to which a plurality of optical fibers 13 are adhered by an adhesive layer 14. As described in the aforementioned Burack et al. patent application, the fibers 13 may be located on the substrate surface by a computer-controlled routing machine, and the adhesive 14 may be a pressure-sensitive adhesive. After the fibers have been routed onto the substrate, it is necessary to encapsulate them to provide structural support for the fibers and to protect them from the environment and from the effects of handling.

To encapsulate the optical fibers, the optical backplane 11 is placed on a lower platen 16 of a press machine which includes an upper platen 17 actuated by a motor 18. The press machine may be a conventional machine such as a type known at the Carver press, Model M (with heated platens), commercially available from Fred S. Carver, Inc. of Menomonee Falls, Wis.

Over the optical fibers and the plastic substrate is placed a layer 20 of thermoplastic material, and over the layer of thermoplastic material is placed a second layer 21 of plastic material that is preferably of the same material as plastic substrate 12. The plastic sheets 12 and 21 may be 0.001 inch Kapton (a trademark) and the thermoplastic layer 20 may be 0.005 inch thick polyurethane of a type known as EXP-71, available from Electro-Seal Corporation of Pompton Lakes, N.J.

A layer 23 of a resilient or spongy thermally conductive material is located between the upper plastic layer 21 and the upper platen 17. The layer 23 is preferably a silicone material that has been doped in a known manner so as to be thermally conductive; it may be one-sixteenth inch thick, conductively doped silicone rubber sponge material known as Cohrlastic R-10404 medium grade silicone, available from the Furon Company of New Haven, Conn. The purpose of the layer 23 is to transmit heat from platen 17 and to distribute stresses over the optical backplane structure so as to avoid concentrations of stress that might damage optical fibers. If desired, the layer 23 may be separated from plastic layer 21 by a sheet of silicone treated release paper (not shown) to prevent unwanted sticking of layers 23 and 21.

The composite structure comprising plastic sheets 12 and 21, thermoplastic layer 20 and optical fibers 13 is heated by a heat source 25 for bonding in two separate steps. In the first step, both platens 16 and 17 are heated by source 25 to one hundred degrees Centigrade and thereafter they press the composite structure together at twenty-five pounds per square inch for one minute. After the one minute, the platens are cooled to thirty-five degrees Centigrade while maintaining the pressure of twenty-five pounds per square inch. The composite structure and layer 23 are then removed from the press machine. In the second step, only the top platen is heated to two hundred degrees Centigrade, the composite structure with layer 23 are inserted, and a low pressure of six pounds per square inch is applied. The lower platen may be maintained at room temperature or at thirty degrees Centigrade or less during this second step.

During the first step, the relatively high pressure and the elevated temperature results produces tacking or good temporary adhesion between the thermoplastic layer and the plastic layers 12 and 21, while the relative solidity of thermoplastic layer 20 protects the optical fibers 13. During the second step, the high temperature reflows the thermoplastic layer 20, which causes it to flow around the optical fibers, fill gaps, and snugly encase the optical fibers, while the applied pressure is low enough to avoid fiber damage. Thereafter, the thermoplastic is cooled under the six pounds per square inch of pressure to harden it and to give a reliable encapsulation which protects the optical fibers and prevents spurious fiber movement.

Figure 2:
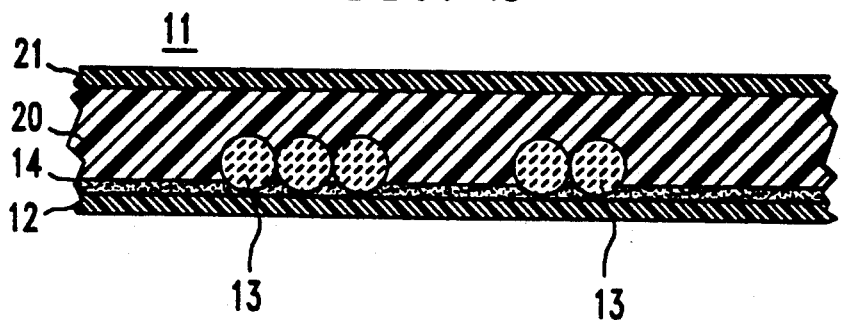
FIG. 2 is a schematic sectional view of an optical backplane made by the apparatus of FIG. 1.

After completion of the process, the optical backplane 11 is removed from the press machine, the thermally conductive layer 23 is removed, and the optical backplane 11 has the cross sectional structure shown in FIG. 2. As can be seen, the optical fibers 13 are securely encased by the thermoplastic material 20. Equally importantly, the encapsulation process has been completed without damaging any of the optical fibers 13, including fibers that may have cross-over locations. As mentioned before, the use of the resilient thermally conductive layer 23 is important for preventing optical fiber damage at cross-over locations. By conforming to the topography of the upper surface of plastic layer 21, it distributes stress that might otherwise damage the fibers.

An advantage of using a thermoplastic material such as polyurethane as the layer 20 is that, at tab ends of the optical backplane, optical fiber ends can be exposed by heating the thermoplastic to its reflow temperature and peeling back the Kapton layers 12 and 21, as may be required for connectorizing the optical fiber ends. When the thermoplastic is cooled, it again hardens and forms about the optical fibers. Polyurethane has the additional advantage of flowing at a suitably low temperature to avoid damage to the fibers.

The foregoing procedure is a consequence of many experiments in trying to encapsulate the optical fibers routed by the methods described in the Burack et al. application. The upper plastic layer 21 is not essential for encapsulating the fibers in accordance with the invention, but it provides good additional structural support, it bonds well with the thermoplastic layer 20, and it provides additional protection against environmental contaminants. It is preferred that the lower surface of upper plastic layer 21 be pre-laminated with thermoplastic of some type as used for layer 20 to insure dependable tacking of the layers 20 and 21 during the first step. Good tacking to substrate 12 is normally assured by the press-sensitive adhesive layer 14. If the upper plastic layer 21 is not used, thermoplastic layer 20 should be thick enough to cover all fiber cross-overs. The invention need not be practiced in conjunction with the methods of the aforementioned Burack et al. application; rather, the optical fibers can be located on the plastic substrate 12 manually or by any of other of various placement techniques. Various other modifications and embodiments may be made by those skilled in the art without departing from the spirit and scope of the invention.

We claim:

1. A method for encapsulating optical fiber comprising the steps of:
    causing the optical fiber to adhere to an upper surface of a flat flexible plastic substrate;
    covering the optical fiber with a sheet of thermoplastic material to form a composite structure comprising said sheet of thermoplastic material, optical fiber and plastic substrate;
    compressing the composite structure at a first elevated temperature and at a first relatively high pressure which are sufficient to cause adherence of the sheet of thermoplastic material to the plastic substrate;
    while maintaining said first relatively high pressure, allowing the composite structure to cool;
    heating the sheet of thermoplastic material to a second elevated temperature while compressing the composite structure at a second pressure;
    the second elevated temperature being higher than said first temperature and being sufficiently high to cause said thermoplastic material to flow about and encase the optical fiber, and the second pressure being smaller than the first pressure and being sufficiently small to avoid damaging said optical fiber.

2. The method of claim 1 further comprising the step of:
    covering the sheet of thermoplastic material with a second sheet of flexible plastic, the second sheet being of the same material as said flexible plastic substrate and constituting part of said composite structure;

and wherein the step of causing adherence of the sheet of thermoplastic material to the flexible plastic substrate also causes adherence of the sheet of thermoplastic material to the second sheet of flexible plastic.

3. The method of claim 2 further comprising the step of:

covering the second sheet of flexible plastic with a layer of resilient thermally conductive material.

4. The method of claim 3 wherein:

the layer of resilient thermally conductive material is thicker than the flexible plastic substrate or the second sheet of flexible plastic and distributes stresses on the composite structure to avoid such concentration of stresses on the optical fiber as might damage the optical fiber.

5. The method of claim 3 wherein:

the compression steps comprise the step of locating the composite structure between upper and lower platens of a press machine and moving closer together said upper and lower platens to compress said composite structure therebetween.

6. The method of claim 5 wherein:

the step of compressing the composite structure at the first elevated temperature comprises the step of heating the upper and lower platens to said first elevated temperature.

7. The method of claim 6 wherein:

the step of heating the sheet of thermoplastic material to the second elevated temperature comprises the step of heating the upper platen to said second elevated temperature while maintaining said lower platen at a temperature of below said second elevated temperature;

and said optical fiber is one of a plurality of optical fibers caused to adhere to the upper surface of said flat flexible plastic substrate.

8. The method of claim 7 wherein:

the thermoplastic material is polyurethane.

9. The method of claim 8 wherein:

the first temperature is about one hundred degrees Centigrade and the second temperature is about two hundred degrees Centigrade.

10. The method of claim 9 wherein:

the first pressure is about twenty-five pounds per square inch and the second pressure is about six pounds per square inch.

11. The method of claim 3 wherein:

the layer of resilient thermally conductive material is an elastomeric silicone;

and said optical fiber is one of a plurality of optical fibers caused to adhere to the upper surface of said flat flexible plastic substrate.

12. A method for encapsulating optical fiber comprising the steps of:

bonding a plurality of optical fibers to a plastic substrate;

covering the optical fibers with thermoplastic material;

using a flat platen to press the thermoplastic material against the optical fibers and the plastic substrate;

including a layer of spongy thermally conductive material between the platen and the thermoplastic material to distribute stresses and to avoid such concentration of stresses on the optical fibers as might damage the optical fibers;

wherein the using step comprises the steps of a) heating the flat platen to a first elevated temperature while pressing at a first pressure to adhere the thermoplastic material to the plastic substrate, and b) thereafter applying a second elevated temperature to the flat platen which is higher than the first temperature while pressing at a second pressure which is lower than the first pressure to cause the thermoplastic material to flow about and encase the optical fibers.

13. The method of claim 12 wherein:

the resilient thermally conductive layer is made predominantly of silicone;

and the thermoplastic material is a polyurethane.

14. The method of claim 12 wherein:

the first temperature is about one hundred degrees Centigrade, the second temperature is about two hundred degrees Centigrade, the first pressure is about twenty-five pounds per square inch and the second pressure is about six pounds per square inch.

* * * * *